US010057669B2

(12) United States Patent
Kaplan (10) Patent No.: US 10,057,669 B2
(45) Date of Patent: Aug. 21, 2018

(54) COMBINATION GLOVE BOX AND SPEAKER BOX DEVICE

(71) Applicant: SSV Works, Inc., Oxnard, CA (US)

(72) Inventor: Trevor Kaplan, Oxnard, CA (US)

(73) Assignee: SSV WORKS, INC., Oxnard, CA (US)

( * ) Notice: Subject to any disclaimer, the term of this patent is extended or adjusted under 35 U.S.C. 154(b) by 0 days.

(21) Appl. No.: 14/852,360

(22) Filed: Sep. 11, 2015

(65) Prior Publication Data

US 2017/0078776 A1     Mar. 16, 2017

(51) Int. Cl.
| H04B 1/00 | (2006.01) |
| H04R 1/02 | (2006.01) |
| B60R 7/04 | (2006.01) |
| B60R 11/02 | (2006.01) |
| B60R 11/00 | (2006.01) |

(52) U.S. Cl.
CPC .............. *H04R 1/025* (2013.01); *B60R 7/04* (2013.01); *B60R 11/0217* (2013.01); *H04R 1/028* (2013.01); *B60R 2011/0005* (2013.01); *H04R 2499/13* (2013.01)

(58) Field of Classification Search
CPC .... H04R 1/025; H04R 1/028; H04R 2499/13; B60R 7/04
USPC ............ 381/86, 87, 333, 334, 335, 336, 289
See application file for complete search history.

(56) References Cited

U.S. PATENT DOCUMENTS

| 2,612,830 A | 10/1952 | Kendrick ...................... 181/141 |
| 3,276,538 A | 10/1966 | Guyton ......................... 181/141 |
| 4,768,870 A | 9/1988 | Chen ............................. 359/871 |
| 5,050,922 A | 9/1991 | Falcoff ........................... 221/311 |
| 5,234,246 A | 8/1993 | Henigue ......................... 180/90 |
| 8,139,810 B2 * | 3/2012 | Armitage ........... B60R 11/0217 381/389 |
| 8,477,986 B1 | 7/2013 | Kiser ............................ 381/388 |
| D689,038 S | 9/2013 | Poandl ......................... D14/172 |
| 8,616,606 B2 | 12/2013 | Ayarturk ....................... 248/483 |
| D703,636 S | 4/2014 | Falck ......................... D14/203.2 |
| 8,714,614 B2 | 5/2014 | Ishikawa .................. 296/193.02 |
| 8,819,745 B2 | 8/2014 | Sizelove ......................... 439/38 |
| 8,884,750 B2 | 11/2014 | Bacal ............................ 340/3.1 |
| 9,363,590 B2 | 6/2016 | Hiramoto |
| 2004/0184628 A1 * | 9/2004 | Nakamichi ............. H04R 5/02 381/302 |

(Continued)

*Primary Examiner* — Vivian Chin
*Assistant Examiner* — Ammar Hamid
(74) *Attorney, Agent, or Firm* — Koppel, Patrick, Heybl & Philpott (57) ABSTRACT

Described herein are devices that combine aspects of storage containers and audio housing devices. These devices can be installed into a vehicle and function as a speaker box for the vehicle's sound system as well as a vehicle's glove box. In some embodiments, devices incorporating features of the present invention include a body that is configured to define a first internal space configured to house one or more audio devices. The body is further configured to define a second internal space configured as a storage container. In some embodiments, the first and second internal spaces are separated by at least one common wall. In some embodiments, the second internal space is at least partially surrounded by the first internal space. In some embodiments, the devices can further comprise one or more speaker driver openings to facilitate sound emission from the devices.

15 Claims, 5 Drawing Sheets

(56) References Cited

U.S. PATENT DOCUMENTS

| | | | |
|---|---|---|---|
| 2008/0031483 A1* | 2/2008 | Hill | F25D 23/12 |
| | | | 381/334 |
| 2010/0263398 A1* | 10/2010 | Webb | F25D 3/08 |
| | | | 62/331 |
| 2012/0025486 A1* | 2/2012 | Armitage | B60R 11/0217 |
| | | | 280/288.4 |
| 2014/0193005 A1* | 7/2014 | Riggs | H04R 5/02 |
| | | | 381/300 |
| 2015/0224942 A1* | 8/2015 | Liono | B60R 11/0217 |
| | | | 381/86 |

* cited by examiner

COMBINATION GLOVE BOX AND SPEAKER BOX DEVICE

BACKGROUND

Field of the Invention

Described herein are devices relating generally to audio equipment and item storage, and specifically for combined audio equipment and item storage devices, for example, for use in a vehicle.

Description of the Related Art

The glove compartment, or glove box, is and has been a ubiquitous feature of vehicles for quite some time. Typically, the glove box is installed in or otherwise built into the dashboard of a vehicle, such as a boat, plane or an automobile, such as a car, truck, all-terrain vehicle (ATV), or utility-task vehicle (UTV). The glove box typically comprises a space for the storage of items, for example, copies of the vehicle's registration and other papers, as well as personal items.

Another ubiquitous feature in many vehicles is the sound system which, among other electronic components, typically comprises one or more speakers. Various qualities can affect the quality and distribution of sound produced by the speakers, including the quality of the speakers themselves and the amount of airspace surrounding the speakers. Speakers are oftentimes housed within a speaker box, which secures the speaker in place and provides it with some quantity of surrounding airspace.

One problem with conventional glove box configurations and speaker box configurations is that both components take up space in a vehicle. This is particularly troublesome in the context of small vehicles, such as many ATVs and UTVs, where space is already very limited. This can result in less room for additional features as well as passenger discomfort. Furthermore, inclusion of both components can further utilize portions of the limited available space within a vehicle and therefore may require a sacrifice of airspace surrounding a speaker within the speaker box, thus reducing sound quality and distribution within the vehicle.

SUMMARY

Described herein are combination speaker box and glove box devices that are configured to perform the functions of both vehicle components. These devices can comprise a body comprising a first internal space configured to house an audio device, for example, a speaker, for example, being configured similar to a conventional subwoofer box, and a second internal space configured to hold personal items similar to a conventional glovebox. In some embodiments, the body is configured such that the portion of the body defining the second internal space protrudes into the first internal space, for example, in a configuration that increases the amount of airspace in the first internal space available for surrounding a speaker housed within the first internal space. In some embodiments, the second internal space can be substantially surrounded by the first internal space.

In one embodiment, a combination speaker box and glove box device comprises a body that defines a first internal space configured to house one or more audio devices and a second internal space configured as a storage compartment. The first internal space and second internal space are separated by at least one common wall and the body is configured to be installed into a vehicle.

In another embodiment, a combination speaker box and glove box device comprises a body with a first portion of the body defining a first internal space configured to house one or more audio devices and a second portion of the body defining a second internal space configured as a storage compartment. The second portion of the body at least partially protrudes into the first internal space.

In yet another embodiment, a combination speaker box and glove box device comprises a body with a first portion of the body defining a first internal space configured to house one or more audio devices and a second portion of the body defining a second internal space configured as a storage compartment. The device further comprises a speaker driver opening in the body and opening into the first internal space and the body is configured to be installed into the dashboard of a vehicle such that the speaker driver opening is internal to said dashboard.

These and other further features and advantages of the invention would be apparent to those skilled in the art from the following detailed description, taken together with the accompanying drawings, wherein like numerals designate corresponding parts in the figures, in which:

DETAILED DESCRIPTION

The present disclosure will now set forth detailed descriptions of various embodiments. These embodiments set forth combination speaker box and glove box devices that can efficiently utilize the internal space available in a vehicle while maximizing surrounding airspace available for audio equipment, such as speakers.

In some embodiments incorporating features of the present invention, the devices comprise a body portion that is shaped or otherwise configured to define at least two internal spaces, a first internal space configured to house one or more audio devices (e.g. the speaker box) and a second internal space configured as a storage container (e.g. the glove box). The devices can be configured to be installed into a vehicle, for example, by comprising connection portions and/or by being shaped or configured to fit into a vehicle in a desired manner, for example, being shaped to fit comfortably into a vehicle's dashboard.

In some embodiments, the space that is configured as a storage container at least partially protrudes into the space configured to house the one or more audio devices. In some embodiments, the space that is configured as a storage container is at least partially surrounded by the space configured to house the one or more audio devices. In some embodiments, the space that is configured as a storage container is separated from the space configured to house the one or more audio devices by at least one common wall. In some embodiments, the devices can further comprise one or more speaker driver openings to facilitate sound emission from the devices.

Throughout this description, the preferred embodiment and examples illustrated should be considered as exemplars, rather than as limitations on the present invention. As used herein, the term "invention," "device," "present invention," or "present device" refers to any one of the embodiments of the invention described herein, and any equivalents. Furthermore, reference to various feature(s) of the "invention," "device," "present invention," or "present device" throughout this document does not mean that all claimed embodiments or methods must include the referenced feature(s).

It is also understood that when an element or feature is referred to as being "on" or "adjacent" to another element or feature, it can be directly on or adjacent the other element or feature or intervening elements or features may also be present. It is also understood that when an element is referred to as being "attached," "connected" or "coupled" to another element, it can be directly attached, connected or coupled to the other element or intervening elements may be present. In contrast, when an element is referred to as being "directly attached," "directly connected" or "directly coupled" to another element, there are no intervening elements present.

Relative terms, such as "outer," "above," "lower," "below," "horizontal," "vertical" and similar terms, may be used herein to describe a relationship of one feature to another. It is understood that these terms are intended to encompass different orientations in addition to the orientation depicted in the figures.

Although the terms first, second, etc. may be used herein to describe various elements or components, these elements or components should not be limited by these terms. These terms are only used to distinguish one element or component from another element or component. Thus, a first element or component discussed below could be termed a second element or component without departing from the teachings of the present invention. As used herein, the term "and/or" includes any and all combinations of one or more of the associated list items.

The terminology used herein is for describing particular embodiments only and is not intended to be limiting of the invention. As used herein, the singular forms "a," "an," and "the" are intended to include the plural forms as well, unless the context clearly indicates otherwise. It will be further understood that the terms "comprises," "comprising," when used herein, specify the presence of stated features, integers, steps, operations, elements, and/or components, but do not preclude the presence or addition of one or more other features, integers, steps, operations, elements, components, and/or groups thereof.

Embodiments of the invention are described herein with reference to different views and illustrations that are schematic illustrations of idealized embodiments of the invention. As such, variations from the shapes of the illustrations as a result, for example, of manufacturing techniques and/or tolerances are expected. Embodiments of the invention should not be construed as limited to the particular shapes of the regions illustrated herein, but are to include deviations in shapes that result, for example, from manufacturing.

It is understood that when a first element is referred to as being "between," "sandwiched," or "sandwiched between," two or more other elements, the first element can be directly between the two or more other elements or intervening elements may also be present between the two or more other elements. For example, if a first element is "between" or "sandwiched between" a second and third element, the first element can be directly between the second and third elements with no intervening elements or the first element can be adjacent to one or more additional elements with the first element and these additional elements all between the second and third elements.

Figure 1:
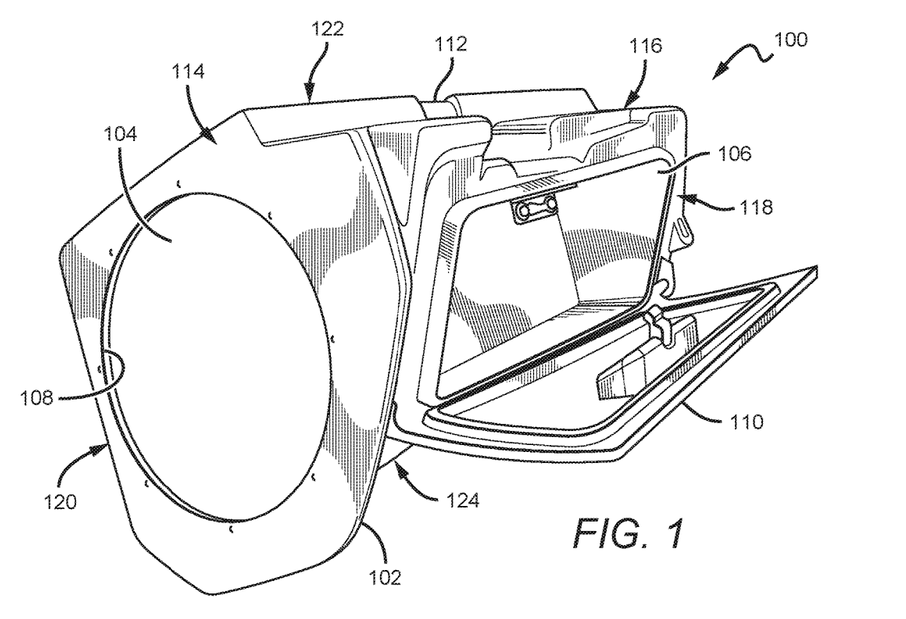
FIG. 1 is a front left-side perspective view of an embodiment of a combination speaker box and glove box device incorporating features of the present invention.

An embodiment of a combination speaker box and glove box device 100 incorporating features of the present invention is shown in FIG. 1. The combination speaker box and glove box device 100 comprises a body 102, which is configured to define a first internal space 104, which is configured to house one or more electronic sound devices, for example, a speaker, a radio, various digital audio media players, or other audio devices. The body 102 of the combination speaker box and glove box device 100 is also configured to define a second internal space 106, which is configured as a storage space, for example, a glove box. The combination speaker box and glove box device 100 can optionally further comprise one or more speaker driver openings 108 (one shown), one or more access doors 110 (one shown, that are configured to allow or restrict access to the second internal space 106, and one or more connection portions 112, configured to allow and/or facilitate connection of the combination speaker box and glove box device 100 to a portion of a vehicle, for example, the vehicle's glovebox.

The body 102 of the combination speaker box and glove box device 100 can comprise any suitable material, with the preferred material being a sturdy material that can support and/or protect internal audio devices. The body 102 can comprise material that have favorable acoustic qualities and that do not prevent or negatively impact the quality of sound produced by an internal audio device. Some suitable materials the body 102 can comprise include, but are not limited to, resin, rubber, vinyl, polyurethane, poly vinyl chloride. (PVC), Poly(methyl methacrylate) (PMMA), polystyrene foam, polymers/copolymer substances, acrylic substances, plastic, metal, glass, fiberglass, wood or a combination thereof.

The body 102 can comprise any suitable shape that will allow the body 102 to define the first internal space 104 and the second internal space 106. Some suitable shapes include any regular or irregular polygon. The body 102 can be formed by any suitable method for example, molding, injection molding, stamping/pressing, three-dimensional printing, extrusion and/or any methods known in the art of sound equipment and/or storage device manufacturing. The body 102 can be formed from multiple component parts or one or more portions of the body can be formed together as a single part. Forming portions of the body together as a single part can improve structural integrity of the device.

The body 102 can be shaped or otherwise configured such that it defines at least two separate spaces, for example, the first internal space 104 and the second internal space 106. The first internal space 104 can be configured to house at least one audio device, for example a speaker. The combination speaker box and glove box device 100 can further comprise a speaker driver opening 108, which can open into the first internal space 104 and allow and/or facilitate an audio device that is internal to the first internal space 104 to more effectively project sound from the speaker driver opening.

In some embodiments, the speaker driver opening 108 allows a speaker driver, such as a woofer, to project from the speaker driver opening 108. The speaker driver opening can be configured with the combination speaker box and glove box device 100 in a variety of different positions. In some embodiments, such as the embodiment shown in FIG. 1, the speaker driver opening 108 is positioned on a lateral portion 114, 116 of the combination speaker box and glove box device 100, that is, a portion of the device 100 other than the front side 118 opening into the second internal space 106, the back side 120 opposite the front side 118, or the top side 122 and bottom side 124. In some embodiments, the body 102 is configured such that the speaker driver opening 108 is configured such that it will be internal to the vehicle when installed, for example, projecting into the dashboard toward the driver of the vehicle.

The second internal space 106 can be configured as a storage space and can therefore perform the function of a vehicle's glove box. In some embodiments, access to the second internal space 106 can be controlled by the access door 110. The access door 110 can utilize various known mechanisms for opening and closing including the use of a hinge-like structure allowing the door 110 to pivot along an axis and corresponding structures that interact or mate with one another to the secure the door 110 in a "closed" position and can be disengaged to allow the door 100 to move to an "open" position.

Figure 2:
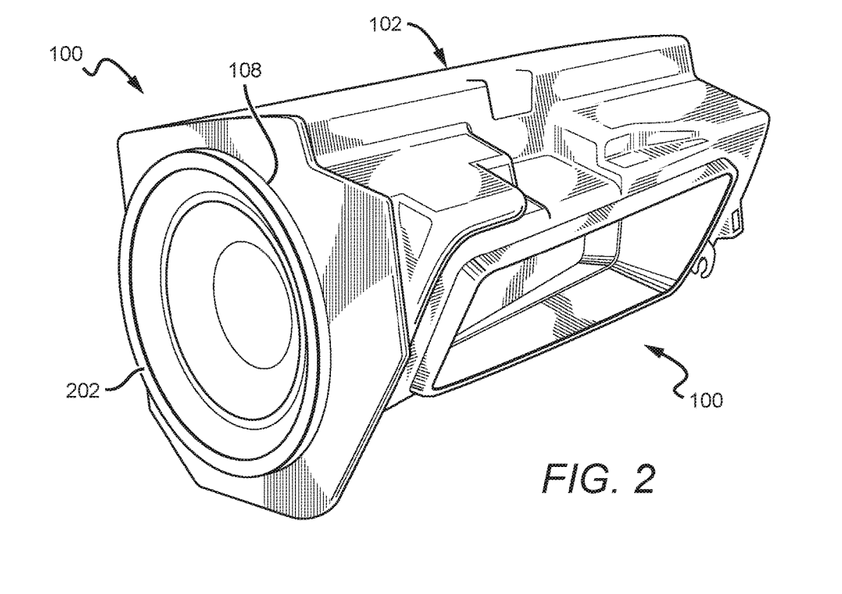
FIG. 2 is another front left-side perspective view of the combination speaker box and glove box device of FIG. 1 shown with an audio device incorporated within.

FIG. 2 shows the combination speaker box and glove box device 100 of FIG. 1, shown with a speaker housed within the body 102 of the device 100. In the embodiment shown in FIG. 2, a speaker driver 202 protrudes from the speaker driver opening to facilitate sound projection from the device 100.

Figure 3:
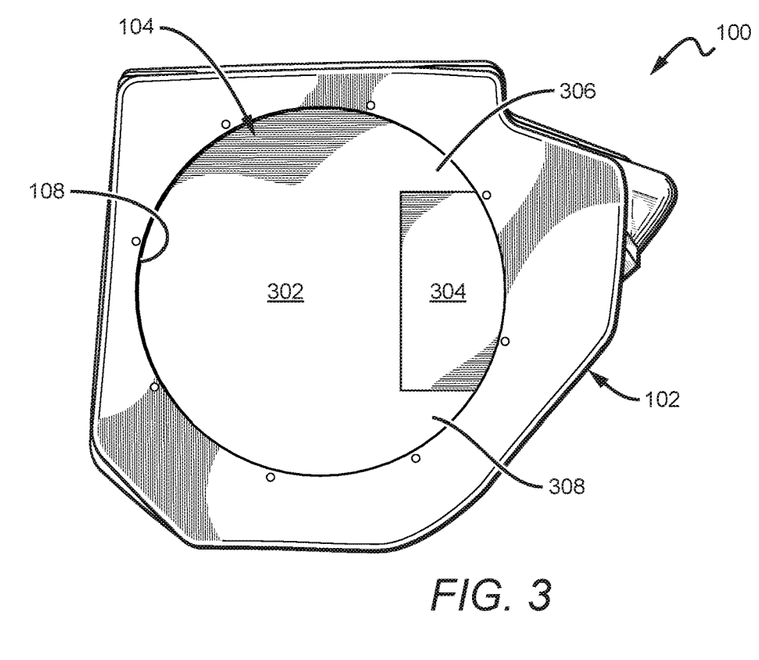
FIG. 3 is a left view of the combination speaker box and glove box device of FIG. 1, further showing an internal portion of the device.

The first internal space 104 of the combination speaker box and glove box device 100 of FIG. 1 is more clearly shown through the speaker driver opening 108 in FIG. 3, which also shows how various portions of the body 102 can be shaped and configured to define the first internal space 104. As shown in FIG. 3, a first portion 302 of the body 102 defines the first internal space 104, which is configured such that it can house an audio device, for example, a speaker, while also allowing for the audio device to be surrounded by a significant amount of airspace to enhance sound quality.

Also shown in FIG. 3, a second portion 304 of the body 102 defines the second internal space (not shown in FIG. 3) and separates the second internal space from the first internal space 104. As shown in FIG. 3, the second portion 304 of the body 102 at least partially protrudes into the first internal space 104. This allows for additional airspace to be utilized in conjunction with an audio device within the first internal space 104 in regions 306, 308 of the first internal space 104 surrounding the second portion 304 of the body 102. Other configurations between the first internal space and the second internal space and the corresponding advantages are set forth in more detail with reference to FIGS. 6-9 below.

Figure 4:
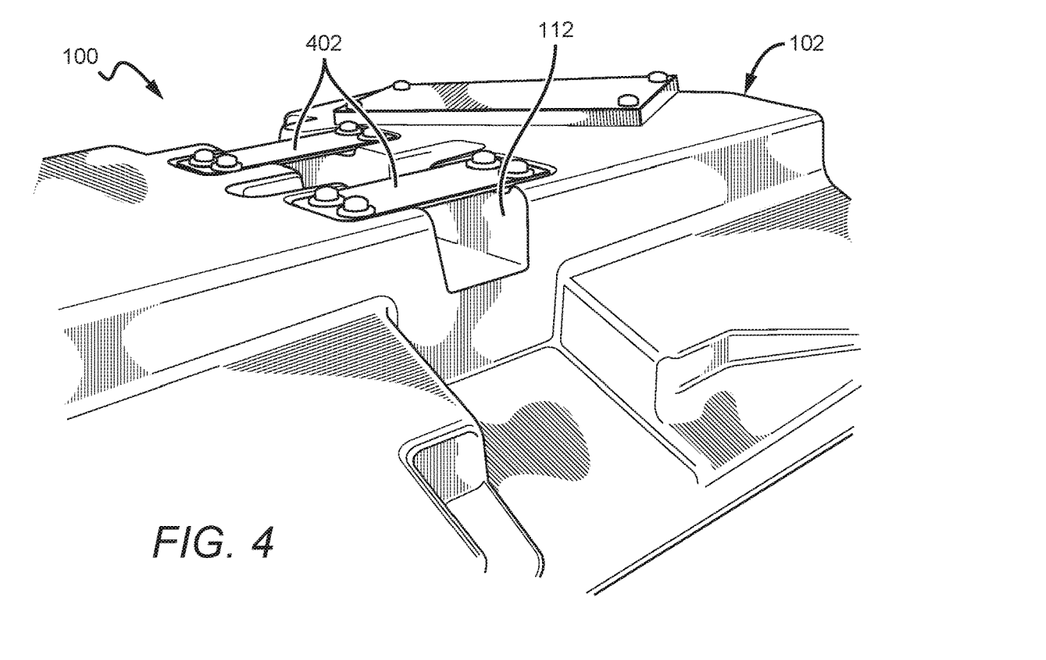
FIG. 4 is a top perspective view of the combination speaker box and glove box device of FIG. 1.

The top portion of the body 102 of the a combination speaker box and glove box device 100 of FIG. 1 is shown in FIG. 4, which shows a more clear view of the connection portions 112. The connection portions 112 can be any suitable structure that is configured to facilitate connection of the combination speaker box and glove box device 100 to a vehicle. The connection portions 112 can be formed internal and/or integral to the body 102 or can be connected to the body through an intermediate structure, for example, a hook structure. In the embodiment shown, the connection portions 112 comprise grooves, which are configured to receive a mounting bar, allowing the device 100 to be mounted within a vehicle. One or more additional securing structures 402 (two shown) can be utilized to secure a mounting bar positioned within the grooves 112 in place. The securing structures 402 can be any suitable structure capable of securing a portion of a vehicle or connection element, for example, a mounting bar, to the connection portions 112. In the embodiment shown, the securing structures 402 are planar structures that are fastened to the top surface of the body 102 and are configured to hold a mounting bar positioned within the grooves 112 in place by applying force to the top surface of the mounting bar.

It is understood that embodiments of the combination speaker box and glove box device 100 can utilize the connection elements 112 but in some embodiments do not. In some embodiments, the combination speaker box and glove box device 100 is configured to be installed into a vehicle by virtue of its shape and/or dimensions and can be installed into the vehicle by any suitable and/or known methods. For example, the shape of the combination speaker box and glove box device 100 can correspond to dimensions and/or shape of the dashboard of a particular vehicle, for example, an ATV or UTV.

Figure 5:
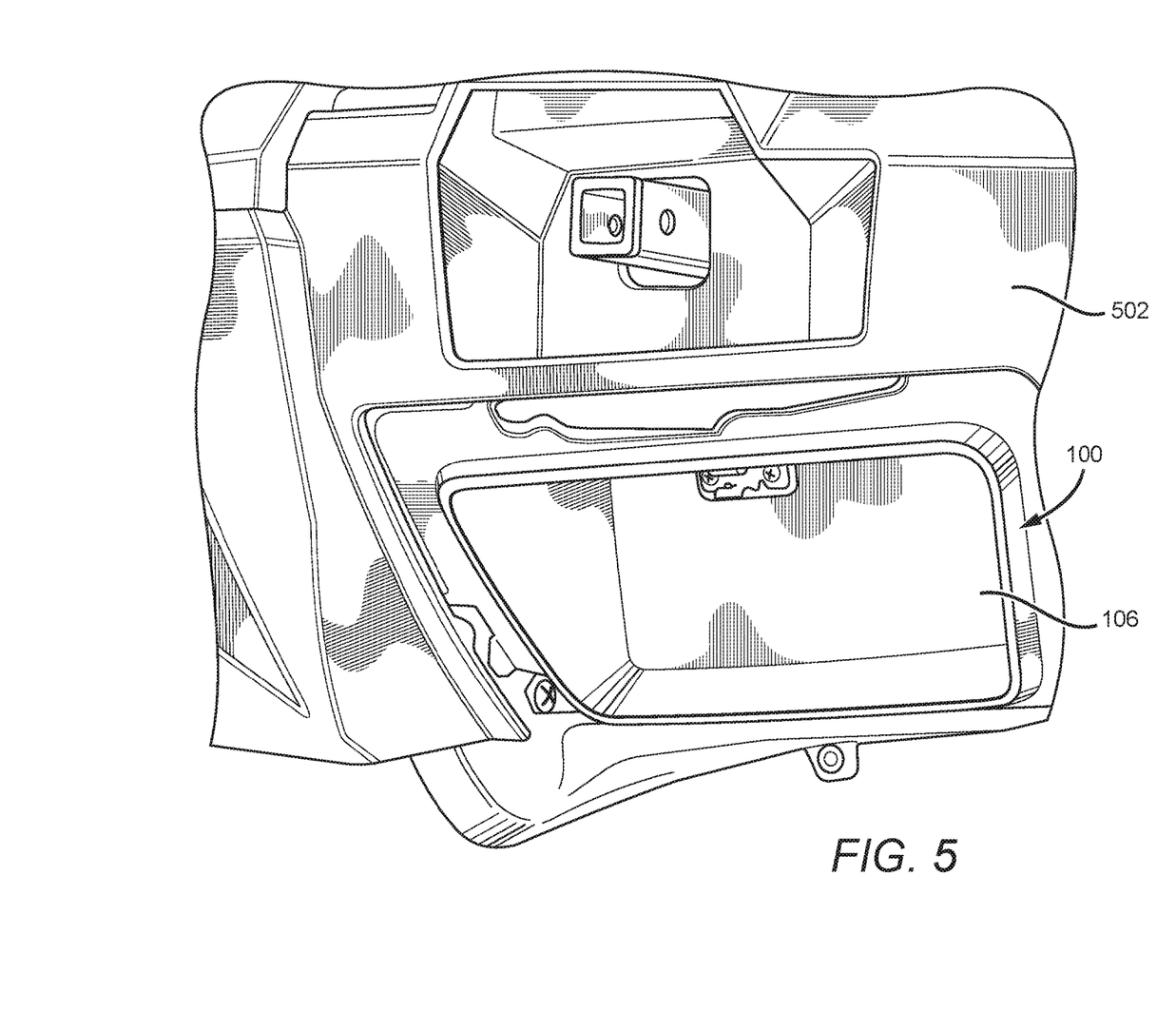
FIG. 5 is a front right-side perspective view of the combination speaker box and glove box device of FIG. 1, shown installed in the dashboard portion of a vehicle.

An example of the combination speaker box and glove box device 100 installed into a vehicle is shown in FIG. 5, which shows the device 100 shown installed in a vehicle's dashboard 502. The first internal space and the speaker driver opening are not shown in FIG. 5, as these features are internal to the dashboard 502. The second internal space 106 is shown and can function as a standard dashboard glove box, while the first internal space can house a speaker and therefore conserve space within the vehicle.

Figure 6:
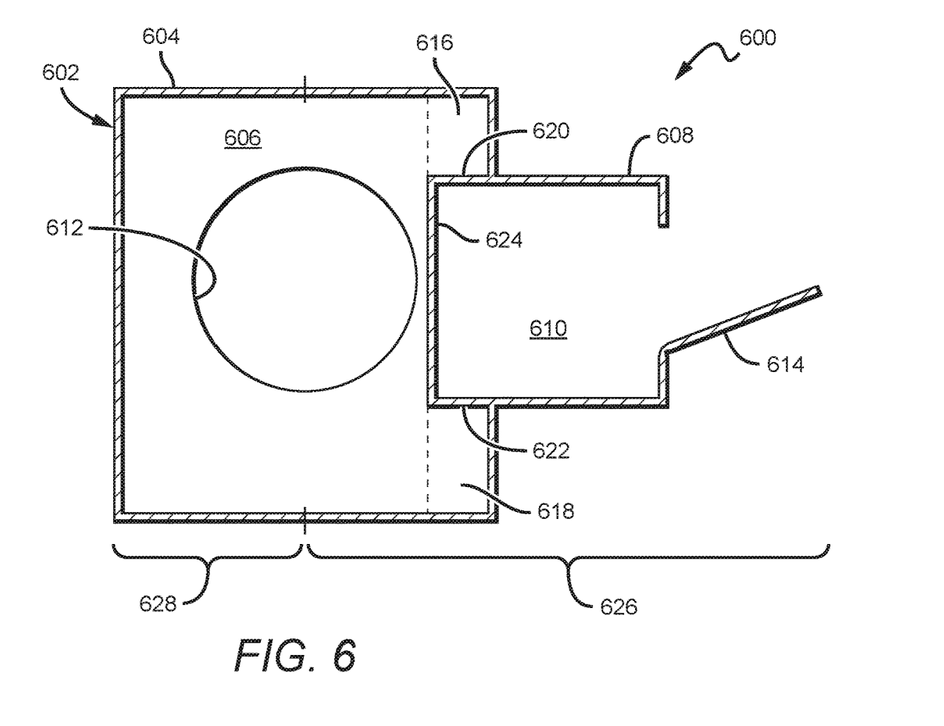
FIG. 6 is a sectional schematic view of another embodiment of a combination speaker box and glove box device incorporating features of the present invention.

Schematic views showing various configurations between internal spaces functioning as audio device housings and storage areas are set forth in FIGS. 6-9. FIG. 6 shows a combination speaker box and glove box device 600 comprising a body 602, which comprises a first body portion 604 configured to define a first internal space 606, and a second body portion 608, configured to define a second internal space 610. The combination speaker box and glove box device 600 can further comprises a speaker driver opening 612, similar to speaker driver opening 108 in FIG. 1, and an access door 614, similar to the access door 110 in FIG. 1. Like with the combination speaker box and glove box device 100 of FIG. 1, the first internal space 606 is configured to house an audio device and the second internal space 610 is configured as a storage area.

As shown in FIG. 6, the second body portion 608 can at least partially protrude into the first internal space 606 such that the first internal space 606 at least partially surrounds a portion of the second internal space 610. This allows for additional regions of the first internal space 606, for example, a first region 616 and a second region 618, to be utilized and to provide additional airspace for an audio device within the first internal space 606. In some embodiments, the second body portion 608 protrudes into the first internal space 606 such that one-quarter of the second internal space 610 is surrounded by the first internal space 606. In other embodiments, the second body portion 608 protrudes into the first internal space 606 such that one-half, one-third, two-thirds or three-quarters of the second internal space 610 is surrounded by the first internal space 606. In some embodiments, the second body portion 608 protrudes into the first internal space 606 such that the second internal space 610 is completely surrounded by the first internal space 606.

As shown in FIG. 6, the protrusion of the second body portion 608 into the first internal space 606 results in the two internal spaces 606, 608 being separated by at least one common wall 620, 622, 624 (three shown). Sharing common walls 620, 622, 624 allows for sound to more easily emanate from the device 600 from an audio device internal to the first internal space 606, as the sound does not have to traverse as many walls and different media. Furthermore, the common walls 620, 622, 624 allow for better integration and enhanced structural integrity of the device 600.

For example, in some embodiments, the body 602 of the device 600 can comprise two body units, a first unit 626 fastened to a second unit 628, wherein each of the units comprise a portion of the body 102 of the device 600. In this manner, a single unit, in this case the first unit 626, can comprise the second body portion 608 integrated into a panel of the first body portion 606. This first body unit 626 can be formed as a single component and therefore enhance the integration of the connection of the first and second body portions, preventing malfunctions such as the second body portion 608 becoming detached from the first body portion 604.

The degree to which one desires the second body portion 608 to protrude into the first internal space 606 depends on the design concerns and needs of a particular vehicle installation. For example, increasing the amount to which the second body portion 608 to protrude into the first internal space 606 decreases the effective space taken up in the interior of the vehicle by the device 600. However, a greater protrusion reduces the available airspace within the first internal space 606, thus affecting sound quality. The reduction of available airspace of the first internal space 606 caused by the protrusion of the second body portion 608 is offset somewhat by the generation of the additional regions 616, 618 formed by the protrusion which would not otherwise be present if the second body portion 608 were simply to abut against the first body portion 604.

In some embodiments, wherein the second body portion 608 abuts against the first body portion 604 without partially protruding into it, the additional regions 616, 618 of the first internal space 606 are not present, resulting in less internal airspace to enhance the sound quality of an internal audio device. Furthermore, in these embodiments wherein the second body portion 608 does not at least partially protrude into the first internal space 606, more space inside a vehicle in which the device 600 is installed is consumed.

Figure 7:
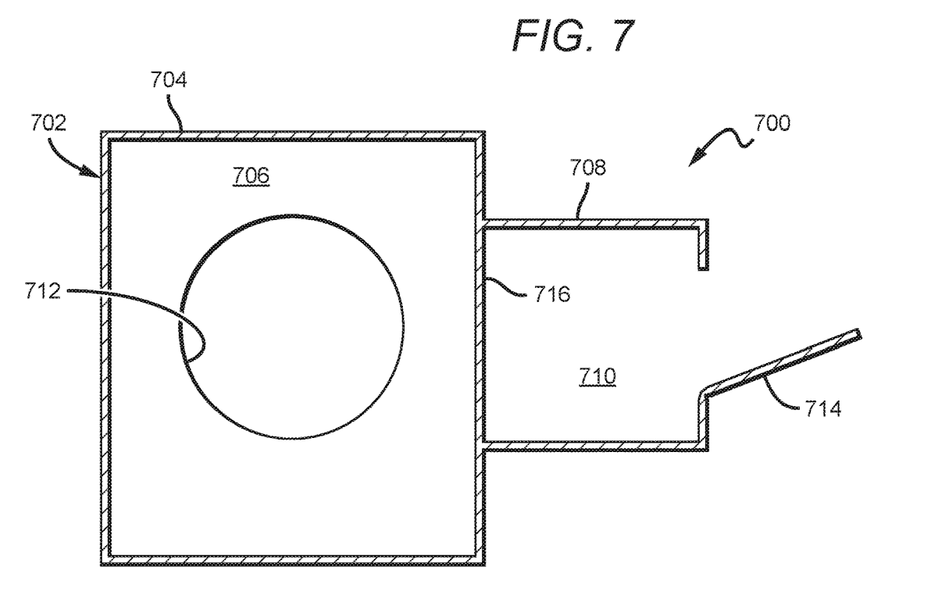
FIG. 7 is a sectional schematic view of yet another embodiment of a combination speaker box and glove box device incorporating features of the present invention.

An example of such a "non-protruding" embodiment is shown in FIG. 7, which shows a combination speaker box and glove box device 700 comprising a body 702, which comprises a first body portion 704 configured to define a first internal space 706, and a second body portion 708, configured to define a second internal space 710. The combination speaker box and glove box device 700 can further comprises a speaker driver opening 712, similar to speaker driver opening 108 in FIG. 1, and an access door 714, similar to the access door 110 in FIG. 1.

Like with the combination speaker box and glove box device 100 of FIG. 1, the first internal space 706 is configured to house an audio device and the second internal space 710 is configured as a storage area. As shown in FIG. 7, the second body portion 708 does not protrude into the first internal space 706 and therefore utilizes more physical space within a vehicle in which it is installed than the embodiment of FIG. 6. Of note is that the second internal space 710 and the first internal space 706 are separated by at least one common wall 716 which can provide the advantages of a common wall as described herein.

Figure 8:
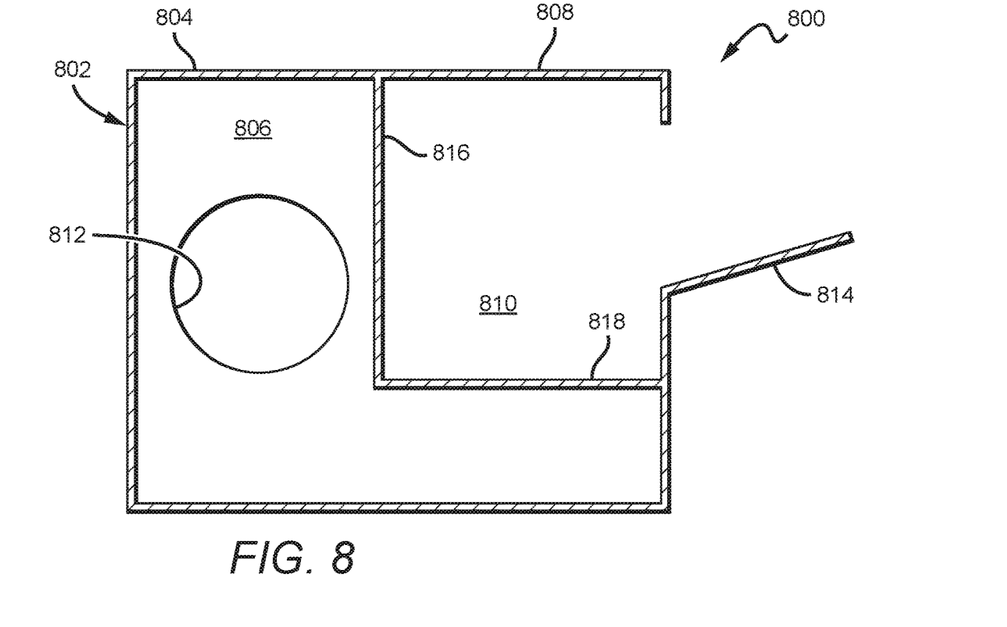
FIG. 8 is a sectional schematic view of still another embodiment of a combination speaker box and glove box device incorporating features of the present invention.

An additional embodiment wherein the first and second internal space abut against each other and share at least one common wall is shown in FIG. 8. FIG. 8 shows a combination speaker box and glove box device 800 comprising a body 802, which comprises a first body portion 804 configured to define a first internal space 806, and a second body portion 808, configured to define a second internal space 810. The combination speaker box and glove box device 800 can further comprises a speaker driver opening 812, similar to speaker driver opening 108 in FIG. 1, and an access door 814, similar to the access door 110 in FIG. 1. Like with the combination speaker box and glove box device 100 of FIG. 1, the first internal space 806 is configured to house an audio device and the second internal space 810 is configured as a storage area. FIG. 8 shows that the first internal space 806 and the second internal space 810 are separated by at least one common wall 816, 818 (two shown), which can provide the advantages of a common wall as described herein.

While many embodiments shown herein feature the first internal space being separated from the second internal space by at least one common wall, embodiments incorporating features of the present invention can include embodiments wherein the first and second internal spaces are separated by one or more walls. For example, in some embodiments, the second internal space can be surrounded by the first internal space, without the spaces being separated by one or more common walls.

Figure 9:
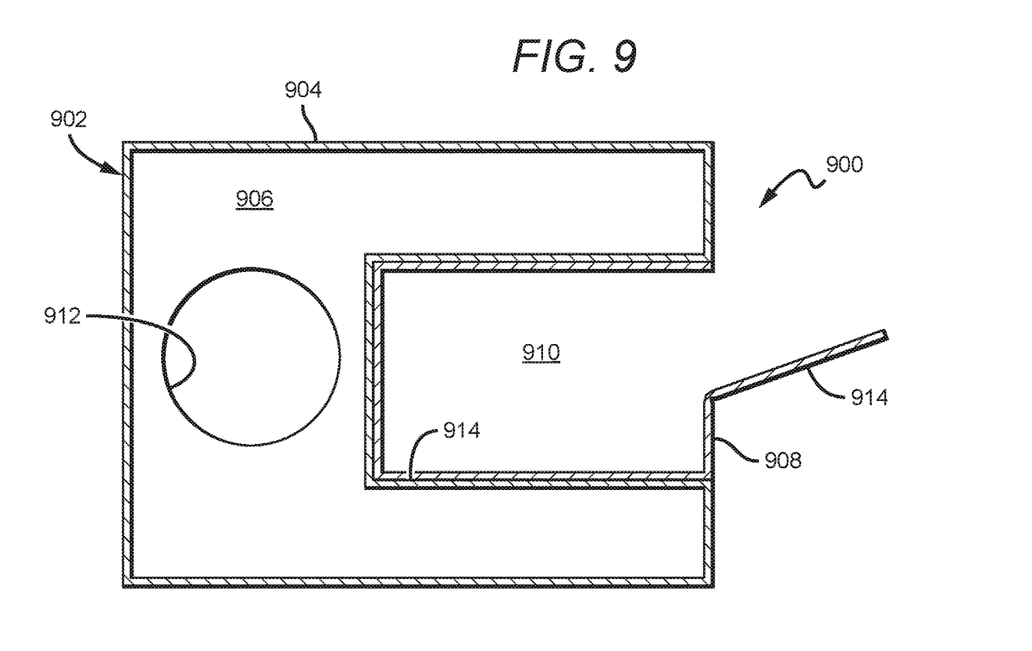
FIG. 9 is a sectional schematic view of still a further embodiment of a combination speaker box and glove box device incorporating features of the present invention.

An example of such an embodiment is set forth in FIG. 9. FIG. 9 shows a combination speaker box and glove box device 900 comprising a body 902, which comprises a first body portion 904 configured to define a first internal space 906, and a second body portion 908, configured to define a second internal space 910. The combination speaker box and glove box device 900 can further comprises a speaker driver opening 912, similar to speaker driver opening 108 in FIG. 1, and an access door 914, similar to the access door 110 in FIG. 1. Like with the combination speaker box and glove box device 100 of FIG. 1, the first internal space 906 is configured to house an audio device and the second internal space 910 is configured as a storage area.

Unlike the previous example embodiments, the combination speaker box and glove box device 900 of FIG. 9 does not have the second body portion 908 protruding into the first body portion 904 such that the first internal space 906 and the second internal space 910 are separated by a common wall. Instead, multiple walls separate the first internal space 906 and the second internal space 910. However, the second internal space 910 is still at least partially surrounded by said first internal space 906, as the second body portion 908 rests within an outer groove 914 of the first body portion 904.

Although the present invention has been described in detail with reference to certain preferred configurations thereof, other versions are possible. Embodiments of the present invention can comprise any combination of compatible features shown in the various figures, and these embodiments should not be limited to those expressly illustrated and discussed. Therefore, the spirit and scope of the invention should not be limited to the versions described above.

The foregoing is intended to cover all modifications and alternative constructions falling within the spirit and scope of the invention as expressed in the claims, wherein no portion of the disclosure is intended, expressly or implicitly, to be dedicated to the public domain if not set forth in any claims.

I claim:

1. A combination speaker box and glove box device, comprising:
a body, said body defining a first internal space configured to house one or more audio devices and a second internal space configured as a storage compartment, wherein said first internal space and said second internal space are separated by at least one common wall and said second internal space is substantially surrounded by said first internal space, wherein said second internal space comprises an access opening in said second internal space, said access opening in a side of said second internal space opposite said at least one common wall;
wherein said body is configured to be installed into a vehicle.

2. The device of claim 1, wherein said body is configured to be installed into the dashboard of a vehicle.

3. The device of claim 1, wherein said device further comprises a door to allow or restrict access to said access opening.

4. The device of claim 1, wherein the portion of said body defining said second internal space at least partially protrudes into said first internal space.

5. The device of claim 1, further comprising a speaker driver opening in said body, said speaker driver opening configured to open into said first internal space.

6. The device of claim 5, wherein said speaker driver opening is configured such that it is internal to said vehicle when said device is installed.

7. The device of claim 1, wherein said body comprises connection portions configured to facilitate connection to a vehicle.

8. A combination speaker box and glove box device, comprising:
a body, a first portion of said body defining a first internal space configured to house one or more audio devices and a second portion of said body defining a second internal space configured as a storage compartment, wherein said second portion of said body at least partially protrudes into said first internal space such that said second internal space is substantially surrounded by said first internal space wherein said second portion of said body comprises an access opening, said access opening in a side of said second portion of said body opposite said portion of said second portion of said body at least partially protruding into said first internal space.

9. The device of claim 8, wherein said body is configured to be installed into the dashboard of a vehicle.

10. The device of claim 8, wherein said device further comprises a door to allow or restrict access to said access opening.

11. The device of claim 8, further comprising a speaker driver opening in said body opening into said first internal space.

12. The device of claim 11, wherein said speaker driver opening is in a lateral portion of said device.

13. A combination speaker box and glove box device, comprising:
a body, a first portion of said body defining a first internal space configured to house one or more audio devices and a second portion of said body defining a second internal space configured as a storage compartment, wherein said second internal space is substantially surrounded by said first internal space, wherein said second portion of said body comprises an access opening, said access opening in a side of said second portion of said body opposite a portion of said second portion of said body bordering said first internal space;
a speaker driver opening in said body and opening into said first internal space;
wherein said body is configured to be installed into the dashboard of a vehicle such that said speaker driver opening is internal to said dashboard.

14. The device of claim 13, wherein said device further comprises a door to allow or restrict access to said second internal space.

15. The device of claim 13, wherein said second portion of said body at least partially protrudes into said first internal space.

* * * * *